United States Patent [19]

Abdullaev et al.

[11] 4,431,034
[45] Feb. 14, 1984

[54] HOSE

[75] Inventors: Gasan M. B. O. Abdullaev; Faramaz G. O. Maxudov; Gabil G. Aliev; Tofik K. O. Ismailov; Damad M. S. O. Miri-Zade; Ilgam A. O. Gasanov; Yashar A. O. Gadzhiev; Rovshan I. O. Shakhmamedov, all of Baku, U.S.S.R.

[73] Assignee: Institut Matematiki I Mekhaniki, Baku, U.S.S.R.

[21] Appl. No.: 217,012

[22] PCT Filed: Apr. 2, 1980

[86] PCT No.: PCT/SU80/00061
§ 371 Date: Dec. 1, 1980
§ 102(e) Date: Dec. 1, 1980

[87] PCT Pub. No.: WO80/02186
PCT Pub. Date: Oct. 16, 1980

[30] Foreign Application Priority Data
Apr. 2, 1979 [SU] U.S.S.R. ............... 2739152

[51] Int. Cl.³ .................................. F16L 11/08
[52] U.S. Cl. .................... 138/130; 138/132; 138/174
[58] Field of Search ............ 138/130, 132, 129, 138, 138/153, 144, 174

[56] References Cited

U.S. PATENT DOCUMENTS

| 885,219 | 4/1908 | Bayne et al. | 138/130 |
| 2,747,616 | 5/1956 | De Ganahl | 138/130 |
| 3,107,698 | 10/1963 | Baker et al. | 138/130 |
| 3,212,528 | 10/1965 | Haas | 138/130 |
| 3,729,028 | 4/1973 | Horvath et al. | 138/130 |
| 3,896,858 | 7/1975 | Whatley | 138/130 |
| 4,106,968 | 8/1978 | Kutnyak et al. | 138/130 X |
| 4,213,485 | 7/1980 | Ottewell et al. | 138/130 |

FOREIGN PATENT DOCUMENTS 833492 10/1938 France ................... 138/130

Primary Examiner—Daniel P. Stodola
Attorney, Agent, or Firm—Robert E. Burns; Emmanuel J. Lobato; Bruce L. Adams

[57] ABSTRACT

A hose comprises an inner supporting tube (1) and an outer protective cover (2), both made of an elastic material. Between the supporting tube (1) and the protective cover (2) there are disposed at least two pairs (3) and (4) of reinforcing plies (5), (6), (7), (8) arranged one directly on another, and a nonmetallic-fabric interlayer (10) disposed directly on the surface of the supporting tube (1) and serving to uniformly distribute the forces arising between the supporting tube (1) and the pairs (3) and (4) of the reinforcing plies (5), (6) and (7), (8). Each of the reinforcing plies (5), (6) and (7), (8) is made in the form of a set of helically wrapped parallel threads (9), and each pair (3) and (4) of the reinforcing plies (5), (6) and (7), (8) is made in the form of two sets of symmetrically wrapped threads (9). The angle of wrapping of the threads (9) in the inner pair (3) of the reinforcing plies (5) and (6) with respect to the geometric axis of the hose is greater than the angle of wrapping of the threads (9) in the outer pair (4) of the reinforcing plies (7) and (8).

3 Claims, 4 Drawing Figures

HOSE

TECHNICAL FIELD

The present invention relates to flexible tubing and particularly to the construction of a hose, and may be used to best advantage for operation under the conditions of high internal pressure and axial tensions in the petroleum, gas, petroleum-processing, chemical, and coal industries.

BACKGROUND ART

The exploitation of oil and gas wells constructions of hoses capable of operation under the conditions of high internal pressures and axial tensions. However, the existing hoses which provide for operation under the above conditions fail to offer adequate flexibility, which greatly complicates their use and transportation. On the other hand the conventional hoses which offer an adequate flexibility are incapable of operation under high axial tensions; this restricts the use of such hoses, for example rendering them completely unfit for lowering into a well or mine.

The problem of providing a flexible hose capable of operation under high internal pressures and axial tensions arose relatively long ago, but still remains to be adequately solved.

There is known in the art a hose disclosed in U.S. Pat. No. 3,715,454. The hose comprises an internal supporting portion in the form of spaced tubular members interconnected by convolutions which are integral with the tubular members and extend radially outwardly from the latter. The convolutions have aligned recesses which define at least one groove extending the full length of the hose, each groove accommodating a reinforcing thread secured to the hose over the entire length thereof.

The hose of the above-described construction may be, depending on the amount of the reinforcing threads, employed for operation either under the action of only an internal pressure or under a simultaneous action of both an internal pressure and an axial tension. In the latter case, an additional amount of the threads is provided to counterbalance the external axial tensile forces. However, increasing the amount of the threads considerably lowers the flexibility of the hose. Thus, the above-described hose reinforced in the axial direction will be capable of operation under a simultaneous action of a high internal pressure and high axial tensile forces, offering low volume, axial, and radial deformations, and a fair durability, but at the same time will have a high specific weight, will be difficult to manufacture and costly.

When adequately reinforced in the axial direction, the hose will have but a very low flexibility. Moreover, it will be incapable for operation in a bent state, since in this case the equality of loading of the reinforcing threads will be upset and thereby the carrying capacity of the construction as a whole will be lowered. The above disadvantages considerably restrict the scope of application of this known.

Another hose construction has been proposed in the French Pat. No. 2,142,764. This hose comprises an inner supporting tube of an elastic material and an outer protective cover, between which reinforcing plies are arranged. Each of the reinforcing plies has the form of a helically wrapped metallic braid, the wrapping angle with respect to the geometrical axis of the hose varying in accordance with a certain relationship from the innermost reinforcing ply to the outermost one within the range of 80° to 6°.

The above-described hose features an adequate flexibility and is capable of withstanding the internal pressure. However, due to the high axial and volume deformations arising in operation, especially with a pulsating internal pressure, the threads of the reinforcing ply braids rub through due to their displacements with respect to one another, which greately impairs the durability of the hose. In addition, a hose of such a construction is incapable of operation under an axial tension.

There is also known in the art a hose disclosed in British Pat. No. 1,334,025. The hose comprises an inner supporting tube of an elastic material and an outer protective cover, between which reinforcing plies are arranged. Each of the reinforcing plies is a multiplicity or set of helically wrapped parallel threads, the angle of wrapping of the threads with respect to the geometrical axis of the hose varying in accordance with a certain relationship from the innermost reinforcing ply to the outermost one within the range of 80° to 6°, and each of the reinforcing plies being disposed between nonmetallic-fabric interlayers.

The above-described hose as well features an adequate flexibility and is capable of withstanding the internal pressure. Moreover, it offers a higher durability as against that of the hose described in French Pat. No. 2,142,764, which is due to separation of individual reinforcing plies by the nonmetallic-fabric interlayers.

Due to a nonuniform distribution of the load from the internal pressure on the threads of each of the reinforcing plies, however, the application of this hose construction is limited to only relatively low internal pressures.

In addition, operation of this hose with a pulsating internal pressure gives rise to unbalanced inter-ply torque stemming from an unequal loading and an asymetrical wrapping of the threads forming the reinforcing plies, which results in a wear of the fabric interlayer due to rubbing and consequently in a failure of the construction.

Known in the art is still another hose disclosed in U.S. Pat. No. 3,212,528 and comprising an inner supporting tube and an outer protective cover, both of an elastic material, and reinforcing plies arranged between the supportion tube and the protective cover. Each of the reinforcing plies is a multiplicity or set of helically wrapped parallel threads (e.g., high-strength steel wires). The threads of successive plies are wrapped in opposite hands; the wrapping angle with respect to the geometric axis of the hose varies from the innermost reinforcing ply to the outermost one within the range of 51° to 59°.

Wrapping of the threads at the angles within the above range derives from the fact that a wrapping angle close to 55° provides for an equal loading of the threads from the internal pressure. A departure of the wrapping angles from this value is due to different diameters of wrapping for each of the reinforcing plies and depends on the amount of said reinforcing plies.

Each of the reinforcing plies is disposed between nonmetallic-fabric interlayers, the innermost of the interlayers being arranged directly on the supporting tube and serving for a uniform distribution of forces arising between the surface of the supporting tube and the reinforcing plies in operation.

The above-described hose offers an adequate flexibility, but is capable to withstand only an internal pressure. It may be used at a fairly high internal pressures, since the load from the internal pressure is uniformly distributed between all the reinforcing plies, and features a higher durability in operation of the hose under a pulsating internal pressure. The latter is accounted for by that the arising inter-layer torques are to a certain extent balanced due to an equal loading and a nearly symmetrical wrapping of the threads forming the reinforcing plies.

However, this hose is capable of withstanding the axial tension because wrapping of the threads which form the reinforcing plies at an angle of 51° to 59° to the geometrical axis of the hose fails to ensure stability of the hose cross-section under an axial tension, since it gives rise to considerable forces exerted by the threads upon the surface of the supporting tube. This upsets the equality of loading of the threads forming the reinforcing plies and consequently results in a failure of the construction.

In view of a considerable specific weight of this hose, it is apparent that it is incapable of operating even under the tension caused by its own gravity.

When this hose is used for operation under a pulsating internal pressure, there occur fairly high axial, radial, and volume deformations, which to certain extent impairs the operational durability of the hose.

SUMMARY OF THE INVENTION

The principal object of the invention is to provide a hose having reinforcing pliers of such a construction which allows the use of the hose under the conditions of simultaneous action of both the internal pressure and the axial tension while retaining the required flexibility thereof.

The object set forth is attained by that there is provided a hose comprising an inner supporting tube and an outer protective cover, both of an elastic material, as well as reinforcing plies interposed therebetween, each of the reinforcing plies having the form of a set of helically wrapped parallel threads, a non-metallic interlayer disposed directly on the surface of the supporting tube and serving to uniformely distribute the forces arising between the supporting tube and the reinforcing plies. According to the invention, there are at least two pairs of the reinforcing plies disposed one directly on the other, each of said pairs being made in the form of two sets of helically wrapped threads and the angle of wrapping of the threads of the inner pair of the reinforcing plies with respect to the geometric axis of the hose exceeding the angle of wrapping of the threads of the outer pair of the reinforcing plies.

Such a construction of the hose provides for the flexibility of the latter due to the above-specified arrangement of the pairs of the reinforcing plies and for its successful application under the conditions of a simultaneous action of both a high internal pressure taken up mainly by the inner pair of reinforcing plies with a large thread wrapping angle and high axial loads taken up mainly by the outer pair of reinforcing plies with a smaller thread wrapping angles.

The above described arrangement of the pairs of the reinforcing plies provides also for operation of the proposed hose under the conditions of a pulsating internal pressure. This stems from that in such a construction, an equal loading of the symmetrically wrapped threads which form the reinforcing plies is attained owing to a joint operation of all the reinforcing plies; this essentially completely counterbalances the inter-ply torques and thereby precludes a displacement of the reinforcing plies with respect to each other. However, this equal loading of the threads owing to a joint operation of all the reinforcing plies allows the proposed hose to be employed for operation under a higher internal pressure.

The construction of the proposed hose having at least two pairs of the reinforcing plies in one of which the angle of wrapping of the threads with respect to the geometrical axis of the hose is larger than in the other provides for low axial, radial, and accordingly, volume deformation in the course of hose operation, and hence ensures a high durability of the hose.

The absence in the hose structure of nonmetallic-fabric interlayers interposed between the reinforcing plies allows the weight, wall thickness, and cost of the hose to be reduced.

The following relations between the maximum values of the internal pressure and axial tension, which the hose can withstand in operation, and the geometrical characteristics as well as the mechanical properties of the materials of which the hose is made have been found:

$$N = L_1 \left[ L_1 \frac{[\sigma_1]}{E_1} - L_2 \frac{[\sigma_2]}{E_2} \right] ;$$

$$P = L_1 \left[ L_3 \frac{[\sigma_2]}{E_2} - L_4 \frac{[\sigma_1]}{E_1} \right] ,$$

where:
P = maximum internal pressure;
N = maximum axial tension;
$L_{1-4}$ = coefficients of structural nonuniformity of the hose, depending on the cross-sectional area of the hose, the amounts and wrapping angles of the threads of the inner and outer pairs of the reinforcing plies, the inside and outside diameters of the hose, the shear modulus and Poisson's ratio of the elastic material;
$[\sigma_1]$ = permissible tension of the threads of the inner pair of the reinforcing plies;
$[\sigma_2]$ = permissible tension of the threads of the outer pair of the reinforcing plies;
$E_1$ = modulus of elasticity of the threads of the inner pair of the reinforcing plies; and
$E_2$ = modulus of elasticity of the threads of the outer pair of the reinforcing plies.

The above relations make it possible proceeding from the internal pressure and axial tension at which a hose is to operate, to determine the required geometrical characteristics of the hose and the mechanical properties of materials to be used for its manufacture, or conversely, from the latter characteristics and properties, to determine the maximum internal pressure and axial tension which a given hose can withstand in operation.

The wrapping angle of the threads of the inner pair of the reinforcing plies is preferably within the range of 75° to 90° and that of the threads of the outer pair of the reinforcing plies, within the range of 0° to 20°.

Selecting the threads wrapping angles within the above ranges imparts cross-sectional stability to the hose and thereby enables it to operate under high axial loads, ensuring at the same time the least axial, radial, and, accordingly, volume deformations in the course of hose operation.

The most reliable under the conditions of an increased internal pressure and/or increased axial loads is such a modification of the hose, wherein at least one additional pair of the reinforcing plies is disposed on the outer pair of the reinforcing plies, the angle of wrapping of each additional pair of the reinforcing plies, which is within the range of 75° to 90°, progressively increases, whereas the angle of wrapping of the threads in each additional pair of the reinforcing plies, which is within the range of 0° to 20°, progressively decreases with respect to the angle of wrapping of the threads in the previous pair of the reinforcing plies, which is within the same range. This change in the wrapping angles of the threads in the additional pairs of reinforcing plies, makes it possible to increase the internal pressure and axial tension which this hose can withstand on average by 6%.

It is advisable that the value of the shift of the angle of wrapping of the threads in each additional pair of the reinforcing plies be within the range of 0.2° to 5° and that the following relation be established between the values of the shifts of the angles of wrapping of the threads in the additional pairs:

$$\Delta\alpha_n = /0.2 - 0.8/\Delta\beta_n$$

where
 $\Delta\alpha_n$-is the value of the shift of the angle of wrapping of the threads in the additional pair of the reinforcing plies, which is within the range of 75° to 90°;
 $\Delta\beta_n$-is the value of the shift of the angle of wrapping of the threads in the additional pair of the reinforcing plies, which is within the range of 0° to 20°.

The threads forming the reinforcing plies are preferably made of fiberglass. This will make it possible to simplify the hose manufacturing procedure as against that for hoses having steel-wire threads as well as to reduce the weight of the hose and to improve its flexibility.

BRIEF DESCRIPTION OF THE DRAWINGS

The invention will now be explained by way of a description of particular embodiments thereof with reference to the accompanying drawings, wherein.

DESCRIPTION OF THE PREFERRED EMBODIMENTS

Figure 1:
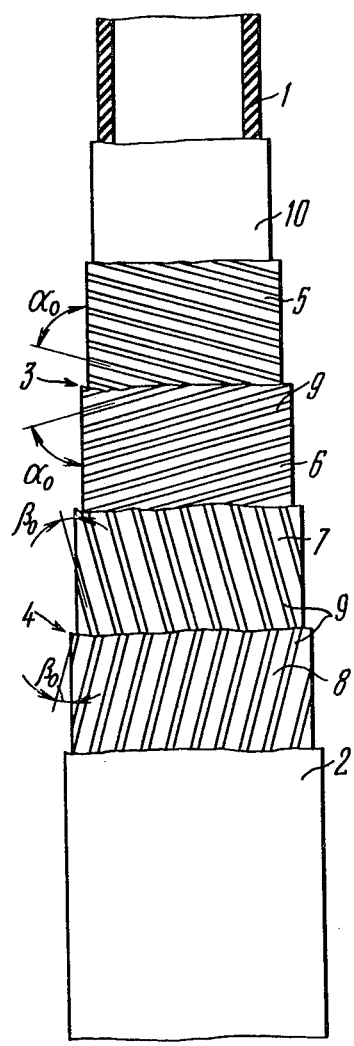
FIG. 1 illustrates the general view of a hose according to the invention, the hose plies being progressively broken away.

Referring to FIG. 1 of the accompanying drawings, the proposed hose comprises an inner supporting tube 1 of an elastic material and an outer protective cover 2 as well made of an elastic material.

At least two pairs 3 and 4 of reinforcing plies 5, 6 and 7, 8 respectively are interposed between the supporting tube 1 and the protective cover 2. In each pair 3 and 4 of the reinforcing plies, one of the plies is disposed directly on the other, and each of said plies has the form of a set of helically wound parallel threads 9. According to the invention, each pair 3 and 4 of the reinforcing plies 5, 6 and 7, 8 has the form of two sets of symmetrically wrapped threads 9, and the angle $\alpha_o$ of wrapping of the threads 9 of the inner pair 3 of the reinforcing plies 5, 6 with respect to the geometrical axis of the hose exceeds the angle $\beta_o$ of wrapping of the threads 9 of the outer pair 4 of the reinforcing plies 7, 8. The density of wrapping of the threads 9 in each reinforcing ply 5, 6, 7, and 8 is of not less than 90%. A nonmetallic-fabric interlayer 10 is interposed between the supporting tube 1 and the inner pair 3 of the reinforcing plies 5, 6; the interlayer 10 serves to uniformly distribute the forces arising between the supporting tube 1 and the pairs 3, 4 of the reinforcing plies 5, 6 and 7, 8 in operation of the hose.

Various angles $\alpha_o$ and $\beta_o$ of wrapping of the threads 9 may be selected, but such a modification of the hose of the invention is the most preferable, wherein, according to the invention, the angle $\alpha_o$ of wrapping of the threads 9 in the inner pair 3 of the reinforcing plies 5, 6 is within the range of 75° to 90° and the angle $\beta_o$ of wrapping of the threads 9 in the outer pair of the reinforcing plies 7, 8 is within the range of 0° to 20°.

The threads 9 forming the reinforcing plies 5, 6, 7, and 8 may be made of any suitable material; however, when the hose is to be used under high operating loads, such a modification is the most preferable, wherein, according to the invention, the threads 9 are made of fiberglass.

Figure 2:
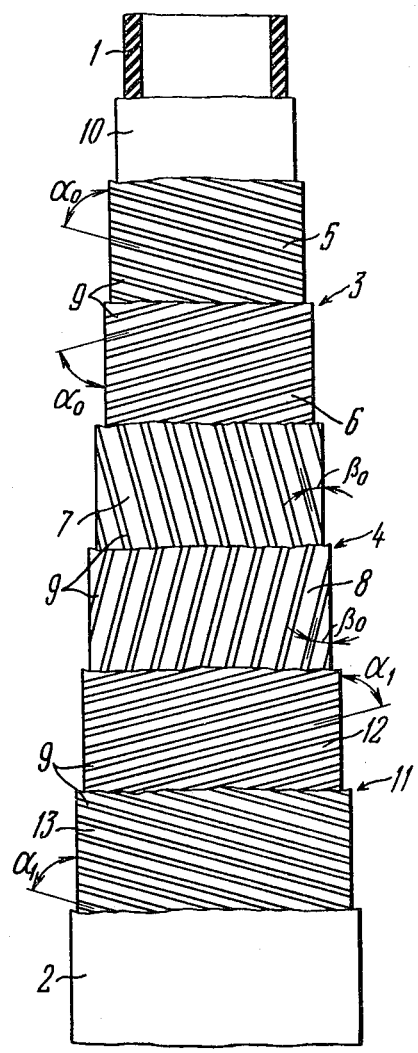
FIG. 2 illustrates a modification of the hose having three pairs of reinforcing plies, the hose plies being progressively broken away.
Figure 3:
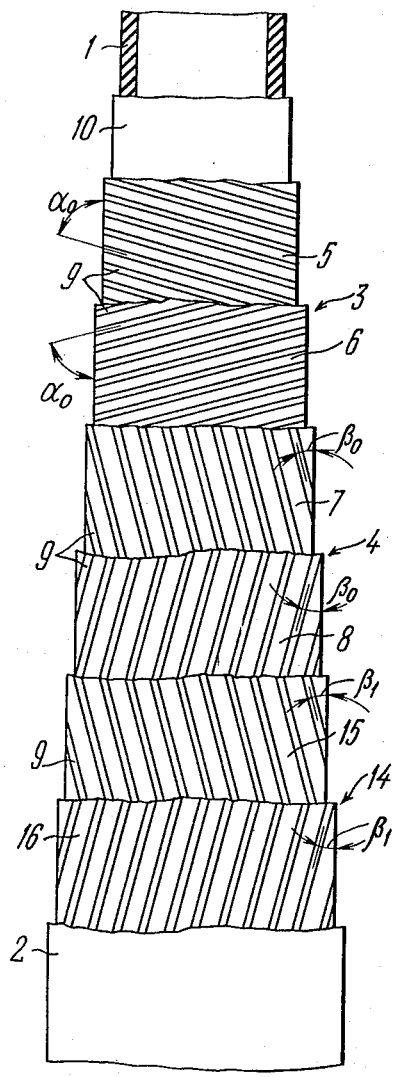
FIG. 3 illustrates a modification of the hose, having three pairs of reinforcing plies, the hose being progressively broken away.
Figure 4:
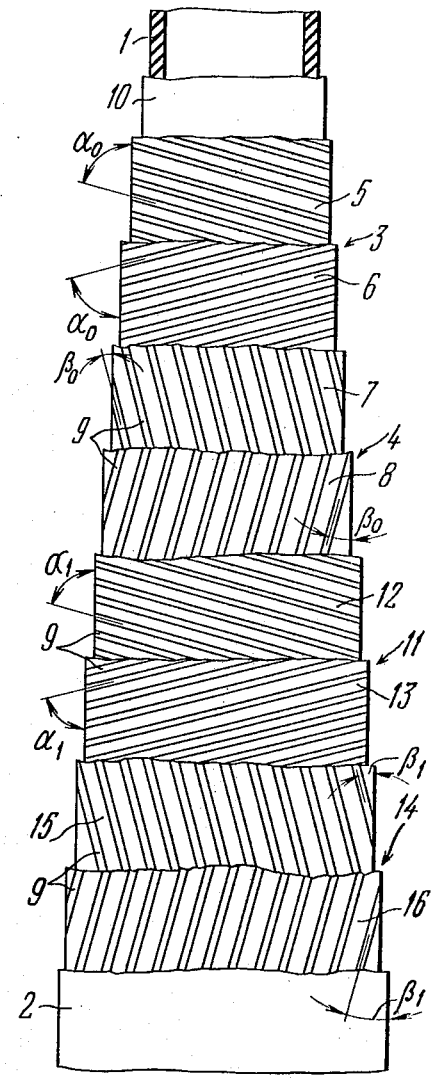
FIG. 4 illustrates a modification of the hose, having four pairs of reinforcing plies, the hose plies being progressively broken away.

FIGS. 2 to 4 illustrate the modifications of the hose, wherein at least one additional pair of the reinforcing plies is disposed on the outer pair of the reinforcing plies.

The modification illustrated in FIG. 2 is expedient for use when the hose is to operate under a high internal pressure. In this modification, an additional pair 11 of reinforcing plies 12 and 13 is disposed directly on the outer pair 4 of the reinforcing plies 12 and 13. The angle $\alpha_o$ of wrapping of the threads 9 in the inner pair 3 of the reinforcing plies 5 and 6 with respect to the geometrical axis of the hose is within the range of 75° to 90° and may be equal to the angle $\alpha_1$ of wrapping of the threads 9 in the additional pair 11 of the reinforcing plies 12 and 13. However, it is advisable that the angle $\alpha_1$ of wrapping of the threads 9 of the pair 11, according to the invention exceed the angle $\alpha_o$ of wrapping of the threads 9 in the pair 3 by 0.2° to 5°.

The angle $\beta_o$ of wrapping of the threads 9 in the pair of the reinforcing plies 7 and 8 is within the range of 0° to 20°. Thus the angles of wrapping $\alpha_o$, $\alpha_1$ of the threads 9 in the pairs 3 and 11 exceed the angle $\beta_o$ of wrapping of the threads 9 of the pair 4.

The modification illustrated in FIG. 3 is expedient for use when the hose is to operate under a high axial tension. In this modification, an additional pair 14 of the reinforcing plies 15 and 16 is disposed directly on the outer pair 4 of the reinforcing plies 7 and 8. The angle $\alpha_o$ of wrapping of the threads 9 in the inner pair 3 of the reinforcing plies 5 and 6 with respect to the geometric axis of the hose is within the range of 75° to 90°. The angle $\beta_o$ of wrapping of the threads 9 in the outer pair 4 of the reinforcing plies 7 and 8 is within the range of 0° to 20° and may be equal to the angle $\beta_1$ of wrapping of the threads 9 in the additional pair 14 of the reinforcing plies 15 and 16. However, it is advisable that the angle $\beta_1$ of wrapping of the threads 9 of the pair 14, according to the invention, be less than the angle $\beta_o$ of wrapping of the threads in the pair 4 by 0.2° to 5°.

Thus the angle $\alpha_o$ of wrapping of the threads 9 in the pair 3 exceed the angles $\beta_o$ and $\beta_1$ of wrapping of the threads 9 of the pairs 4 and 14.

The modification illustrated in FIG. 4 is suitable for use when the hose is to operate under both a high internal pressure and a high axial tension. In this modification, additional pairs 11 and 14 of the reinforcing plies respectively 12, 13 and 15, 16 are disposed directly one on the other directly on the outer pair 4 of the reinforcing plies 7 and 8. The angle $\alpha_o$ of wrapping of the threads 9 in the inner pair 3 of the reinforcing plies 5 and 6 with respect to the geometric axis of the hose is within the range of 75° to 90° and may be equal to the angle $\alpha_1$ of wrapping of the threads 9 in the additional pair 11 of the reinforcing plies 12 and 13. The angle $\beta_o$ of wrapping of the threads 9 of the outer pair 4 of the reinforcing plies 7 and 8 is within the range of 0° to 20° and may be equal to the angle $\beta_1$ of wrapping of the threads 9 in the additional pair 14 of the reinforcing plies 15 and 16.

However, it is advisable that the angle $\alpha_1$ of wrapping of the threads 9 in the pair 11, according to the invention, exceed the angle $\alpha_o$ of wrapping of the threads 9 in the pair 3 by 0.2° to 5°, and the angle $\beta_1$ of wrapping of the threads 9 in the pair 14, according to the invention, be less than the angle $\beta_o$ of wrapping of the threads 9 of the pair 4 by 0.2° to 5°. The value of the shift of the angles of wrapping of the threads 9 of the additional pairs 11 and 14 is selected in accordance with the following relation:

$$\Delta\alpha_1 = /0.2 - 0.8/\Delta\beta_1,$$

where $$\Delta\alpha_1 = \alpha_1 - \alpha_o,$$

$$\Delta\beta_1 = \beta_o - \beta_1.$$

The hose of the invention operates as follows.

When the hose operates under an internal pressure and axial tension, the internal pressure is transmitted from the supporting tube (FIG. 1) to the pairs 3 and 4 of the reinforcing plies 5 and 6, 7 and 8; the internal pressure is uniformly distributed by the nonmetallic-fabric interlayer 10 and is taken up mainly by the pair 3 of the reinforcing plies 5 and 6, and partly, also by the pair 4 of the reinforcing plies 7 and 8. The pair 4 of the reinforcing plies 7 and 8 takes up mainly the axial tension which is also partly transmitted to the pair 3 of the reinforcing plies 5 and 6.

In operation of the hose modification illustrated in FIG. 2, the internal pressure is taken up mainly by the pairs 3 and 11 of the reinforcing plies 5, 6 and 12, 13, whereas the axial tension is taken up mainly by the pair 4 of the reinforcing plies 7 and 8.

In operation of the hose modification illustrated in FIG. 3, the internal pressure is taken up mainly by the pair 3 of the reinforcing plies 5 and 6, whereas the axial tension is taken up mainly by the pairs 4 and 14 of the reinforcing plies 7, 8 and 15, 16.

In operation of the hose modification illustrated in FIG. 4, the internal pressure is taken up mainly by the pairs 3 and 11 of the reinforcing plies 5, 6 and 12, 13, whereas the axial tension is taken up mainly by the pairs 4 and 14 of the reinforcing plies 7, 8 and 15, 16.

Presented below are Examples of specific embodiments of the hose of the invention.

EXAMPLE 1

A hose was manufactured, comprising an inner supporting tube 1 (FIG. 1) and an outer protective cover 2, both made of a rubber having the modulus of elasticity of $E_o = 80$ kgf/cm². Two pairs 3 and 4 of reinforcing plies 5, 6 and 7, 8 were interposed between the supporting tube 1 and the protective cover 2. The reinforcing plies 5, 6, 7, and 8 were wrapped from sets of fiberglass threads. The angle $\alpha_o$ of wrapping of threads 9 in the inner pair 3 of the reinforcing plies 5 and 6, according to the invention, was 82°, and the angle $\beta_o$ of wrapping of the threads 9 of the outer pair 4 of the reinforcing plies 7 and 8, according to the invention, was 14°. The diameter of the threads 9 of the inner pair 3 of the reinforcing plies 5 and 6 was $d_1 = 0.0975$ cm, and the diameter of the threads 9 of the outer pair 4 of the reinforcing plies 7 and 8, $d_1 = 0.0770$ cm.

The threads 9 of the inner pair of the reinforcing plies 5 and 6 had a modulus of elasticity of $E_1 = 0.4750 \cdot 10^6$ kgf/cm² and the permissible stress of $[\sigma_1] = 8.016.3$ kgf/cm². The threads 9 of the outer pair 4 of the reinforcing plies 7 and 8 had modulus of elasticity of $E_2 = 0.5207 \cdot 10^6$ kgf/cm² and the permissible stress of $[\sigma_2] = 8.389.3$ kgf/cm². The density of wrapping of the threads 9 in both the inner pair 3 of the reinforcing plies 5 and 6 and the outer pair 4 of the reinforcing plies 7 and 8 was of 90%.

A 0.05 cm thick cotton-fabric interlayer 10 was disposed directly on the surface of the supporting tube 1.

The hose thus manufactured had an inside diameter of 3.8 cm and an outer diameter of 6.1 cm. The weight of a linear meter of the hose was 2.0 kg.

The hose was tested for the maximum internal pressure, axial tension, radial, axial, and volume deformation, and minimum bending radius.

The test of the hose for internal pressure was carried out in the following way. The length of the hose under test met the conditions of $L \geq 20$ $d_{in}$, where L is the hose length and $d_{in}$ is the inside diameter of the hose. The hose was coupled to a hand pump with whose aid a liquid (in this case, water) was pumped into the hose. The pressure of the liquid in the hose was measured with a pressure gauge; the volume of the liquid pumped in, with a burette; and the change in the hose length, with a meter rule. In this way, the maximum values of the internal pressure, radial, axial, and volume deformations were determined. The value of the maximum volume deformation was found from the following relation:

$$\epsilon_v = \frac{V_1 - V_o}{V_o} \cdot 100\%,$$

where $V_1$ is the volume of the pumped-in liquid at the moment of the maximum internal pressure and $V_o$ is the initial volume of the inner space of the hose.

The maximum axial deformation was found from the following relation:

$$\epsilon_{ax} = \frac{L_1 - L_o}{L_o} \cdot 100\%,$$

where $L_1$ is the hose length at the moment of the maximum internal pressure and $L_o$ is the initial hose length.

The maximum radial deformation was determined from the following relation:

$$\epsilon_{rad} = \frac{d_1 - d_o}{d_o} \cdot 100\%.$$

To determine the maximum value of axial tension, a one meter long hose was tested under a joint action of the internal pressure and axial tensile force with the use of a tensile testing machine and a hand pump whereto the hose was coupled. In the course of the test, a constant internal pressure was maintained by pumping the liquid with a hand pump. At the moment when the axial tensile force reached its maximum, the maximum values of the axial, radial, and volume deformations were found from the above formulas.

The bending test of the hose was conducted on a test stand. The hose was coupled to a hand pump, and a working internal pressure in the range of 150 to 250 kgf/cm$^2$ was maintained in the course of the test by pumping the liquid into the inner space of the hose. The hose was bent till the threads of the reinforcing plies broke, and the minimum bending radius was thus determined.

The test results were the following:

| | |
|---|---|
| maximum internal pressure, kgf/cm$^2$ | 720 |
| maximum axial tension, metric ton-force | 26.2 |
| maximum radial deformation, percent of the initial dimensions of the unloaded hose | 0.2 |
| maximum radial deformation, percent of the initial dimensions of the unloaded hose | 0.9 |
| maximum volume deformation, percent of the initial dimensions of the unloaded hose | 1.1 |
| minimum bending radius of the hose, meters | 0.6 |

EXAMPLE 2

A hose was manufactured, comprising an inner supporting tube 1 (FIG. 1) and an outer protective cover 2, both made of a rubber having a modulus of elasticity of $E_o = 80$ kgf/cm$^2$. The pairs 3 and 4 of reinforcing plies 5, 6 and 7, 8 were interposed between the supporting tube 1 and the protective cover 2. The reinforcing plies 5, 6, 7, and 8 were wrapped from sets of fiberglass threads. The angle $\alpha_o$ of wrapping of threads 9 in the inner pair 3 of the reinforcing plies 5 and 6, according to the invention, was 90°, and the angle $\beta_o$ of wrapping of the threads 9 in the outer pair 4 of the reinforcing plies 7 and 8, according to the invention, was 5°. The diameter of the threads 9 in the inner pair 3 of the reinforcing plies 5 and 6 was of $d_1 = 0.0975$ cm, and the diameter of the threads 9 in the outer pair 4 of the reinforcing plies 7 and 8, $d_2 = 0.0770$ cm.

The threads 9 in the inner pair 3 of the reinforcing plies 5 and 6 had an elasticity modulus of $E_1 = 0.4750 \cdot 10^6$ kgf/cm$^2$ and a permissible stress of $[\sigma_1] = 8,016.3$ kgf/cm$^2$. The threads 9 in the outer pair 4 of the reinforcing plies 7 and 8 had an elasticity modulus of $E_2 = 0.5207$ kgf/cm$^2$ a permissible stress of $[\sigma_2] = 8,389.3$ kgf/cm$^2$.

The density of wrapping of the threads 9 in both the inner pair 3 of the reinforcing plies 5 and 6 and the outer pair 4 of the reinforcing plies 7 and 8 was 90%.

A 0.05 cm thick cotton-fabric interlayer 10 was disposed directly on the surface of the supporting tube 1.

The hose thus manufactured had an inside diameter of 1.0 cm and an outside diameter of 3.6 cm. The weight of a linear meter of the hose was of 0.7 kg.

The hose was tested in accordance with the procedure outlined in Example 1.

The test results were the following:

| | |
|---|---|
| maximum internal pressure, kgf/cm$^2$ | 1,300 |
| maximum axial tension, metric ton-force | 8.2 |
| maximum radial deformation, percent of the initial dimensions of the unloaded hose | 0.1 |
| maximum axial deformation, percent of the initial dimensions of the unloaded hose | 1.2 |
| maximum volume deformation, percent of the initial dimensions of the unloaded hose | 1.3 |
| minimum bending radius of hose, meters | 0.3 |

EXAMPLE 3

A hose was manufactured, comprising an inner supporting tube 1 (FIG. 1) and an outer protective cover 2 both made of a rubber having a modulus of elasticity of $E_o = 80$ kgf/cm$^2$. Two pairs 3 and 4 of reinforcing plies 5, 6 and 7, 8 were interposed between the supporting tube 1 and the protective cover 2. The reinforcing plies 5, 6, 7, and 8 were wrapped from sets of fiberglass threads 9. The angle $\alpha_o$ of wrapping of the threads 9 in the inner pair 3 of the reinforcing plies 5 and 6, according to the invention, was of 75°, and the angle $\beta_o$ wrapping of the threads 9 in the outer pair 4 of the reinforcing plies 7 and 8, according to the invention, was 18°. The diameter of the threads 9 in the inner pair of the reinforcing plies 5 and 6 was $d_1 = 0.0975$ cm, and the diameter of the threads 9 in the outer pair 4 of the reinforcing plies 7 and 8, d=0.0770 cm.

The threads 9 in the inner pair 3 of the reinforcing plies 5 and 6 had a modulus of elasticity of $E_1 = 0.4750.10$ kgf/cm$^2$ and a permissible stress of $[\sigma_1] = 8,016.3$ kgf/cm$^2$. The threads 9 in the outer pair 4 of the reinforcing plies 7 and 8 had a modulus of elasticity of $E_2 = 0.5207 \cdot 10^6$ kgf/cm$^2$ and a permissible stress of $[\sigma_2] = 8,389.3$ kgf/cm$^2$. The density of wrapping of the threads 9 in Both the inner pair 3 of the reinforcing plies 5 and 6 and the outer pair 4 of the reinforcing plies 7 and 8 was of 90%.

A 0.05 cm thick cotton-fabric interlayer 10 was disposed directly on the surface of the supporting tube 1.

The hose thus manufactured had an inside diameter of 1.6 cm and an outside diameter of 4.2 cm. The weight of a linear meter of the hose was 1.3 kg.

The hose was tested in accordance with the procedure outlined in Example 1.

The test results were the following:

| | |
|---|---|
| maximum internal pressure, kgf/cm$^2$ | 950 |
| maximum axial tension, metric ton-force | 8.5 |
| maximum radial deformation, percent of the initial dimensions of the unloaded hose | 0.9 |
| maximum axial deformation, percent of the initial dimensions of the unloaded hose | 0.3 |
| maximum volume deformation, percent of the initial dimensions of the unloaded hose | 1.2 |
| minimum bending radius of hose, meters | 0.3 |

EXAMPLE 4

A hose was manufactured, comprising an inner supporting tube 1 (FIG. 1) and an outer protective cover 2, both made of a rubber having a modulus of elasticity of $E_o=80$ kgf/cm². Two pairs 3 and 4 of the reinforcing plies 5, 6 and 7, 8 were interposed between the supporting tube 1 and the protective cover 2. The reinforcing plies 5, 6, 7, and 8 were wrapped from sets of fiberglass threads 9. The angle $\alpha_o$ of wrapping of the threads 9 in the inner pair 3 of the reinforcing plies 5 and 6, according to the invention, was 80°, and the angle $\beta_o$ of wrapping of the threads 9 in the outer pair 4 of the reinforcing plies 7 and 8, according to the invention, was 0°. The diameter of the threads 9 in the inner pair 3 of the reinforcing plies 5 and 6 was $d_1=0.0975$ cm, and the diameter of the threads 9 in the outer pair 4 of the reinforcing plies 7 and 8, $d_2=0.0770$ cm.

The threads 9 in the inner pair of the reinforcing plies 5 and 6 had a modulus of elasticity of $E_1=0.4750 \cdot 10^6$ kgf/cm² and a permissible stress of $[\sigma_1]=8,016.3$ kgf/cm². The threads 9 in the outer pair 4 of the reinforcing plies 7 and 8 had a modulus of elasticity of $E_2=0.5207 \cdot 10^6$ kgf/cm² and a permissible stress of $[\sigma_2]=8,389.3$ kgf/cm².

The density of wrapping of the threads 9 of both the inner pair 3 of the reinforcing plies 5 and 6 and the outer pair 4 in the reinforcing plies 7 and 8 was 90%.

A 0.05 cm thick cotton-fabric interlayer 10 was disposed directly on the surface of the supporting tube 1.

The hose thus manufactured had an inside diameter of 10.0 cm and an outside diameter of 12.8 cm. The weight of a linear meter of the hose was of 4.4 kg.

The hose was tested in accordance with the procedure outlined in Example 1.

The test results were as follows:

| | |
|---|---|
| maximum internal pressure, kgf/cm² | 410 |
| maximum axial tension, metric ton-force | 40.0 |
| maximum radial deformation, percent the initial dimensions of the unloaded hose | 1.0 |
| maximum axial deformation, percent of the initial dimensions of the unloaded hose | 0.2 |
| maximum volume deformation, percent of the initial dimensions of the unloaded hose | 1.2 |
| minimum bending radius of hose, meters | 1.8 |

EXAMPLE 5

A hose was manufactured, comprising an inner supporting tube 1 (FIG. 1) and an outer protective cover 2, both made of rubber having a modulus of elasticity of $E_o=80$ kgf/cm². Two pairs 3 and 4 of reinforcing plies 5, 6 and 7, 8 were interposed between the supporting tube 1 and the protective cover 2. The reinforcing plies 5, 6, 7 and 8 were wrapped from sets of fiberglass threads 9. The angle $\alpha_o$ of wrapping of the threads 9 in the inner pair 3 of the reinforcing plies 5 and 6, according to the invention, was 85°, and the angle $\beta_o$ of wrapping of the threads 9 in the outer pair of the reinforcing plies 7 and 8, according to the invention, was 20°. The diameter of the threads 9 in the inner pair 3 of the reinforcing plies 5 and 6 was $d_1=0.0975$ cm, and the diameter of the threads 9 in the outer pair 4 of the reinforcing plies 7 and 8, $d_2=0.0770$ cm.

The threads 9 in the inner pair 3 of the reinforcing plies 5 and 6 had a modulus of elasticity of $E_1=0.4750 \cdot 10^6$ kgf/cm² and a permissible stress of $[\sigma_1]=8,016.3$ kgf/cm². The threads 9 in the outer pair 4 of the reinforcing plies 7 and 8 had a modulus of elasticity of $E_2=0.5207 \cdot 10^6$ kgf/cm² and an allowable stress of $[\sigma_2]=8,389.3$ kgf/cm².

The density of wrapping of the threads 9 in both the inner pair 3 of the reinforcing plies 5 and 6 and the outer pair 4 the reinforcing plies 7 and 8 was of 90%.

A 0.05 cm thick cotton-fabric interlayer 10 was disposed directly on the surface of the supporting tube 1.

The hose thus manufactured had an inside diameter of 1.0 cm and an outside diameter of 3.6 cm. The weight of a linear meter the hose was of 0.7 kg.

The hose was tested in accordance with the procedure outlined in Example 1.

The results of testing were the following:

| | |
|---|---|
| maximum internal pressure, kgf/cm² | 1,100 |
| maximum axial tension, metric ton-force | 7.0 |
| maximum radial deformation, percent of the initial dimensions of the unloaded hose | 0.4 |
| maximum axial deformation, percent of the initial dimensions of the unloaded hose | 1.1 |
| maximum volume deformation, percent of the initial dimensions of the unloaded hose | 1.5 |
| minimum bending radius of hose, meters | 0.15 |

EXAMPLE 6

A hose was manufactured, comprising an inner supporting tube 1 (FIG. 1) and an outer protective cover 2, both made of a rubber having a modulus of elasticity of $E_o=80$ kgf/cm². Two pairs 3 and 4 of reinforcing plies 5, 6 and 7, 8 were interposed between the supporting tube 1 and the protective cover 2. The reinforcing plies 5, 6, 7, and 8 were wrapped from sets of fiberglass threads 9. The angle $\alpha_o$ of wrapping of the threads 9 in the inner pair 3 of the reinforcing plies 5 and 6, according to the invention, was 70°, and the angle $\beta_o$ of wrapping of the threads 9 in the outer pair 4 of the reinforcing plies 7 and 8, according to the invention, was of 15°. The diameter of the threads 9 in the inner pair 3 of the reinforcing plies 5 and 6 was $d_1=0.0975$ cm, and the diameter of the threads 9 in the outer pair 4 of the reinforcing plies 7 and 8, $d_2=0.0770$ cm.

The threads 9 in the inner pair 3 of the reinforcing plies 5 and 6 had a modulus of elasticity of $E_1=0.4750 \cdot 10^6$ kgf/cm² and a permissible stress of $[\sigma_1]=8,016.3$ kgf/cm². The threads 9 in the outer pair 4 of the reinforcing plies 7 and 8 had a modulus of elasticity of $E_2=0.520 \cdot 10^6$ kgf/cm² and a permissible stress of $[\sigma_2]=8,389.3$ kgf/cm².

The density of wrapping of the threads 9 in both the inner pair 3 of the reinforcing plies 5 and 6 and the outer pair 4 of the reinforcing plies 7 and 8 was 90%.

A 0.05 cm thick contton-fabric interlayer 10 was disposed directly on the surface of the supporting tube 1.

The hose thus manufactured had an inside diameter of 1.6 cm and an outside diameter of 4.2 cm. The weight of a linear meter of hose was 1.3 kg.

The hose was tested in accordance with the procedure outlined in Example 1.

The test results were as follows:

| | |
|---|---|
| maximum internal pressure, kgf/cm² | 820 |
| maximum axial tension, metric ton-force | 8.0 |
| maximum radial deformation, percent of the initial dimensions of the unloaded hose | 0.6 |
| maximum axial deformation, percent of the initial dimensions of the unloaded hose | 0.7 |
| maximum volume deformation, percent of the initial dimensions of the unloaded hose | 1.3 |

| | |
|---|---|
| minimum bending radius of hose, meters | 0.3 |

EXAMPLE 7

A hose was manufactured, comprising an inner supporting tube 1 (FIG. 1) and an outer protective cover 2, both made of a rubber having a modulus of elasticity of $E_o = 80$ kgf/cm². The pairs 3 and 4 of the reinforcing plies 5, 6 and 7, 8 were interposed between the supporting tube 1 and the protective cover 2. The reinforcing plies 5, 6, 7, and 8 were wrapped from sets of fiberglass threads 9. The angle $\alpha_o$ of wrapping of the threads 9 in the inner pair 3 of the reinforcing plies 5 and 6, according to the invention, was of 86°, and the angle $\beta_o$ of wrapping of the threads 9 in the outer pair 4 of the reinforcing plies 7 and 8, according to the invention, was of 25°. The diameter of the threads 9 in the inner pair 3 of the reinforcing plies 5 and 6 was of $d_1 = 0.0975$ cm, and the diameter of the threads 9 in the outer pair 4 of the reinforcing plies 7 and 8, of $d_2 = 0.0770$ cm.

The threads 9 in the inner pair 3 of the reinforcing plies 5 and 6 had a modulus of elasticity of $E_1 = 0.47\text{-}50\cdot10^6$ kgf/cm² and a permissible stress of $[\sigma_1] = 8,016.3$ kgf/cm². The threads 9 in the outer pair 4 of the reinforcing plies 7 and 8 had a modulus of elasticity of $E_2 = 0.5207\cdot10^6$ kgf/cm² and a permissible stress of $[\sigma_2] = 8,389.3$ kgf/cm².

The density of wrapping of the threads 9 in both the inner pair 3 of the reinforcing plies 5 and 6 and the outer pair 4 of the reinforcing plies 7 and 8 was 90%.

A 0.05 cm thick cotton-fabric interlayer 10 was disposed directly on the surface of the supporting tube 1.

The hose thus manufactured had an inside diameter of 7.5 cm and an outside diameter of 10.3 cm. The weight of a linear meter of the hose was of 3.6 kg.

The hose was tested in accordance with the procedure outlined in Example 1.

The test results were as follows:

| | |
|---|---|
| maximum internal pressure, kgf/cm² | 480 |
| maximum axial tension, metric ton-force | 20.0 |
| maximum radial deformation, percent of the initial dimensions of the unloaded hose | 0.4 |
| maximum axial deformation, percent of the initial dimensions of the unloaded hose | 1.4 |
| maximum volume deformation, percent of the initial dimensions of the unloaded hose | 1.8 |
| minimum bending radius of hose, meters | 0.8 |

EXAMPLE 8

A hose was manufactured, comprising an inner supporting tube 1 (FIG. 1) and an outer protective cover 2, both made of a rubber having a modulus of elasticity of $E_o = 80$ kgf/cm². Two pairs 3 and 4 of reinforcing plies 5, 6 and 7, 8 were interposed between the supporting tube 1 and the protective cover 2. The reinforcing plies 5, 6, 7, and 8 were wrapped from sets of fiberglass threads. The angle $\alpha_o$ of wrapping of threads 9 in the inner pair 3 of the reinforcing plies 5 and 6, according to the invention, was 78°, and the angle $\beta_o$ of wrapping of the threads 9 in the outer pair 4 of the reinforcing plies 7 and 8, according to the invention, was 12°.

The diameter of the threads 9 in the inner pair 3 of the reinforcing plies 5 and 6 was $d_1 = 0.0975$ cm, and the diameter of the threads 9 in the outer pair 4 of the reinforcing plies 7 and 8, of $d_2 = 0.0770$ cm.

The threads 9 in the inner pair 3 of the reinforcing plies 5 and 6 had a modulus of elasticity of $E_1 = 0.47\text{-}50\cdot10^6$ kgf/cm² and a permissible stress of $[\sigma_1] = 8,016.3$ kgf/cm². The threads 9 in the outer pair 4 of the reinforcing plies 7 and 8 had a modulus of elasticity of $E_2 = 0.5207\cdot10^6$ kgf/cm² and a permissible stress of $[\sigma_2] = 8,389.3$ kgf/cm².

The density of wrapping of the threads 9 in both the inner pair 3 of the reinforcing plies 5 and 6 and the outer pair 4 of the reinforcing plies 7 and 8 was 90%.

A 0.05 cm thick cotton-fabric interlayer 10 was disposed directly on the surface of the supporting tube 1.

The hose thus manufactured had an inside diameter of 2.5 cm and an outside diameter of 5.1 cm. The weight of a linear meter of the hose was of 1.6 kg.

The hose was tested in accordance with the procedure outlined in Example 1.

The rest results were the following:

| | |
|---|---|
| maximum internal pressure, kgf/cm² | 680 |
| maximum axial tension, metric ton-force | 16.0 |
| maximum radial deformation, percent of the initial dimensions of the unloaded hose | 0.5 |
| maximum axial deformation, percent of the initial dimensions of the unloaded hose | 0.6 |
| maximum volume deformation, percent of the initial dimensions of the unloaded hose | 1.1 |
| minimum bending radius of hose, meters | 0.4 |

EXAMPLE 9

A hose was manufactured, comprising an inner supporting tube 1 (FIG. 2) and an outer protective cover 2, both made of a rubber having a modulus of elasticity of $E_o = 80$ kgf/cm². Three pairs 3, 4, and 11 of reinforcing plies 5 and 6, 7 and 8, 12 and 13 were interposed between the supporting tube 1 and the protective cover 2. The reinforcing plies 5 and 6, 12 and 13 were wrapped from sets of polyamide-fibre threads 9, and the reinforcing plies 7 and 8, from sets of fiberglass threads 9. The angle $\alpha_o$ of wrapping of the threads 9 in the pair 3 of the reinforcing plies 5 and 6 was equal to $d_1$ of the wrapping of threads 9 in the pair 11 of the reinforcing plies 12 and 13 and was 82°, and the angle $\beta_o$ of wrapping of the threads 9 in the pair 4 of the reinforcing plies 7 and 8 was 16°.

The diameter of the threads 9 in the pairs 3 and 11 of the reinforcing plies 5 and 6, 12 and 13 was $d_1 = 0.16$ cm, and the diameter of the threads 9 in the pair 4 of the reinforcing plies 7 and 8, $d_2 = 0.0975$ cm.

The threads 9 in the pairs 3 and 11 of the reinforcing plies 5 and 6, 12 and 13 had a modulus of elasticity of $E_1 = 0.0038\cdot10^6$ kgf/cm² and a permissible stress of $[\sigma_1] = 2,000.0$ kgf/cm². The threads 9 in the pair 4 of the reinforcing plies 7 and 8 had a modulus of elasticity of $E_2 = 0.4750\cdot10^6$ kgf/cm² and a permissible stress of $[\sigma_2] = 8,016.3$ kgf/cm².

The density of wrapping of the threads 9 in the pairs 3, 4, and 11 of the reinforcing plies 5, 6, 7, 8, 12, and 13 was 90%.

A 0.05 cm thick cotton-fabric interlayer 10 was disposed directly on the surface of the supporting tube 1.

The hose thus manufactured had an inside diameter of 1.6 cm and an outside diameter of 4.4 cm. The weight of a linear meter the hose was of 1.5 kg.

The hose was tested in accordance with the procedure outlined in Example 1.

The test results were the following:

| | |
|---|---|
| maximum internal pressure, kgf/cm$^2$ | 760 |
| maximum axial tension, metric ton-force | 7.0 |
| maximum radial deformation, percent of the initial dimensions of the unloaded hose | 1.2 |
| maximum axial deformation, percent of the initial dimensions of the unloaded hose | 0.8 |
| maximum volume deformation, percent of the initial dimensions of the unloaded hose | 2.0 |
| minimum bending radius of hose, meters | 0.35 |

EXAMPLE 10

A hose was manufactured, comprising an inner supporting tube 1 (FIG. 2) and an outer protective cover 2, both made of a rubber having a modulus of elasticity of $E_o=80$ kgf/cm$^2$. Three pairs 3, 4, and 11 of reinforcing plies 5 and 6, 7 and 8, 12 and 13 were interposed between the supporting tube 1 and the protective cover 2. The reinforcing plies 5, 6, 7, 8, 12, and 13 were wrapped from sets of fiberglass threads 9. The angle $\alpha_o$ of wrapping of the threads 9 in the pair 3 of the reinforcing plies 5 and 6 was equal to the angle $\alpha_1$ of wrapping of the threads in the pair 11 of the reinforcing plies 12 and 13 and was 87°, and the angle $\beta_o$ of wrapping of the threads 9 in the pair 4 of the reinforcing plies 7 and 8, according to the invention, was 18°. The diameter of the threads 9 in the pairs 3 and 11 of the reinforcing plies 5 and 6, 12 and 13 was $d_1=0.0975$ cm, and the diameter of the threads 9 in the pair 4 of the reinforcing plies 7 and 8, was $d_2=0.0770$ cm.

The threads 9 in the pairs 3 and 11 of the reinforcing plies 5 and 6, 12 and 13 had a modulus of elasticity of $E_1=0.4750\cdot 10^6$ kgf/cm$^2$ and a permissible stress of $[\sigma_1]=8,016.3$ kgf/cm$^2$. The threads 9 in the pair 4 of the reinforcing plies 7 and 8 had a modulus of elasticity of $E_2=0.5207\cdot 10^6$ kgf/cm$^2$ and a permissible stress of $[\sigma_2]=8,389.3$ kgf/cm$^2$.

The density of wrapping of the threads 9 in the pairs 3 and 11 of the reinforcing plies 5 and 6, 12 and 13 and in the pair 4 of the reinforcing plies 7 and 8 was of 90%.

A 0.05 cm thick cotton-fabric interlayer 10 was disposed directly on the surface of the supporting tube 1. The hose thus manufactured had an inside diameter of 1.0 cm and an outside diameter of 3.7 cm. The weight of a linear meter of the hose was of 0.8 kg.

The hose was tested in accordance with the procedure outlined in Example 1.

The test results were the following:

| | |
|---|---|
| maximum internal pressure, kgf/cm$^2$ | 1,920 |
| maximum axial tension, metric ton-force | 5.0 |
| maximum radial deformation, percent of the initial dimensions of the unloaded hose | 0.3 |
| maximum axial deformation, percent of the initial dimensions of the unloaded hose | 0.9 |
| maximum volume deformation, percent of the initial dimensions of the unloaded hose | 1.2 |
| minimum bending radius of hose, meters | 0.2 |

EXAMPLE 11

A hose was manufactured, comprising an inner supporting tube 1 (FIG. 2) and an outer protective cover 2, both made of a rubber having a modulus of elasticity of $E_o=240$ kgf/cm$^2$. Three pairs 3, 4 and 11 of reinforcing plies 5 and 6, 7 and 8, 12 and 13 were interposed between the supporting tube 1 and the protective cover 2. The reinforcing plies 5 and 6, 12 and 13 were wrapped from sets of polyamide-fibre threads 9, and the reinforcing plies 7 and 8, from sets of fiberglass threads 9. The angle $\alpha_o$ of wrapping of the threads 9 in the pair 3 of the reinforcing plies 5 and 6 was equal to the angle $\alpha_1$ of wrapping of the threads 9 of the pair 11 of the reinforcing 12 and 13 was 87°, and the angle $\beta_o$ of wrapping of the threads 9 in the pair 4 of the reinforcing plies 7 and 8, according to the invention, was 8°. The diameter of the threads 9 in the pairs 3 and 11 of the reinforcing plies 5 and 6, 12 and 13 was $d_1=0.16$ cm, and the diameter of the threads 9 in the pair 4 of the reinforcing plies 7 and 8, $d_2=0.0770$ cm.

The threads 9 in the pairs 3 and 11 of the reinforcing plies 5 and 6, 12 and 13 had a modulus of elasticity of $E_1=0.0038\cdot 10^6$ kgf/cm$^2$ and a permissible stress of $[\sigma_1]=2,000.0$ kgf/cm$^2$. The threads 9 in the pair 4 of the reinforcing plies 7 and 8 had a modulus of elasticity of $E_2=0.5207\cdot 10^6$ kgf/cm$^2$ and a permissible stress of $[\sigma_2]=8,389.3$ kgf/cm$^2$.

The density of wrapping of the threads 9 in the pairs 3, 4, and 11 of the reinforcing plies 5, 6, 7, 8, 12, 13 was of 90%.

A 0.05 cm thick cotton-fabric interlayer 10 was disposed directly on the surface of the supporting tube 1.

The hose thus manufactured had an inside diameter of 1.6 cm and an outside diameter of 4.4 cm. The weight of a linear meter of the hose was 1.5 kg.

The hose was tested in accordance with the procedure outlined in Example 1.

The test results were the following:

| | |
|---|---|
| maximum internal pressure, kgf/cm$^2$ | 890 |
| maximum axial tension, metric ton-force | 8.0 |
| maximum radial deformation, percent of the initial dimensions of the unloaded hose | 1.0 |
| maximum axial deformation, percent of the initial dimensions of the unloaded hose | 0.3 |
| maximum volume deformation, percent of the initial dimensions of the unloaded hose | 1.3 |
| minimum bending radius of hose, meters | 0.35 |

EXAMPLE 12

A hose was manufactured, comprising an inner supporting tube 1 (FIG. 3) and an outer protective cover 2, both made of a rubber having a modulus of elasticity of $E_o=240$ kgf/cm$^2$. Three pairs 3, 4, and 14 of reinforcing plies 5 and 6, 7 and 8, 15 and 16 were interposed between the supporting tube 1 and the protective cover 2. The reinforcing plies 5 and 6 were wrapped from sets of fiberglass threads 9, and the reinforcing plies 7 and 8, 15 and 16, from sets of polyamide-fibre threads 9. The angle $\alpha_o$ of wrapping of the threads 9 in the pair 3 of the reinforcing plies 5 and 6 was 86°, and the angle $\beta_o$ of wrapping of the threads 9 of the pair of the reinforcing plies 7 and 8 was equal to the angle $\beta_1$ of wrapping of the threads 9 in the pair 14 of the reinforcing plies 15 and 16 and was 12°. The diameter of the threads 9 in the pair 3 of the reinforcing plies 5 and 6 was of $d_1=0.0770$ cm, and the diameter of the threads 9 of the pairs 4 and 14 of the reinforcing plies 7 and 8, 15 and 16, $d_2=0.16$ cm.

The threads 9 in the pair 3 of the reinforcing plies 5 and 6 had a modulus of elasticity of $E_1=0.5207\cdot 10^6$ kgf/cm$^2$ and a permissible stress of $[\sigma_1]=8,389.3$ kgf/cm². The threads 9 in the pairs 4 and 14 of the reinforcing plies 7 and 8, 15 and 16 had a modulus of elasticity of $E_2=0.0028\cdot10^6$ kgf/cm² and a permissible stress of $[\sigma_2]=2,000.0$ kgf/cm².

The density of wrapping of the threads 9 in the pairs 3, 4, and 14 of the reinforcing plies 5, 6, 7, 8, 15 and 16 was 90%.

A 0.05 cm thick cotton-fabric interlayer 10 was disposed directly on the surface of the supporting tube 1.

The hose thus manufactured had an inside diameter of 2.5 cm and an outside diameter of 5.3 cm. The weight of a linear meter of the hose was 1.7 kg.

The hose was tested in accordance with the procedure outlined in Example 1.

The test results were the following:

| | |
|---|---|
| maximum internal pressure, kgf/cm² | 660 |
| maximum axial tension, metric ton-force | 7.0 |
| maximum radial deformation, percent of the initial dimensions of the unloaded hose | 0.6 |
| maximum axial deformation, percent of the initial dimensions of the unloaded hose | 3.0 |
| maximum volume deformation, percent of the initial dimensions of the unloaded hose | 3.6 |
| minimum bending radius of hose, meters | 0.45 |

EXAMPLE 13

A hose was manufactured, comprising an inner supporting tube 1 (FIG. 3) and an inner protective cover 2, both made of a rubber having a modulus of elasticity of $E_o=380$ kgf/cm². Three pairs 3, 4, and 14 of reinforcing plies 15 and 16 were interposed between the supporting tube 1 and the protective cover 2. The reinforcing plies 5 and 6, 7 and 8, 15 and 16 were wrapped from sets of fiberglass threads 9. The angle $\alpha_o$ of wrapping of the threads 9 in the pair 3 of the reinforcing plies 5 and 6 was 78°, and the angle $\beta_o$ of wrapping of the threads 9 in the pair 4 of the reinforcing plies 7 and 8 was equal to the angle $\beta_1$ of wrapping of the threads 9 in the pair 14 of the reinforcing plies 15 and 16 and amounted to 5°. The diameter of the threads 9 in the pair 3 of the reinforcing plies 5 and 6 was $d_1=0.055$ cm, and the diameter of the threads 9 in the pairs 4 and 14 of the reinforcing plies 7 and 8, 15 and 16, $d_2=0.0975$ cm.

The threads 9 in the pair 3 of the reinforcing plies 5 and 6 had a modulus of elasticity of $E_1=0.5950\cdot10^6$ kgf/cm² and a permissible stress of $[\sigma_1]=8,423.0$ kgf/cm². The threads 9 in the pairs 4 and 14 of the reinforcing plies 7 and 8, 15 and 16 had a modulus of elasticity of $E_2=0.4750\cdot10^6$ kgf/cm² and a permissible stress of $[\sigma_2]=8,016.3$ kgf/cm².

The density of wrapping of the threads 9 in the pairs 3, 4, and 14 of the reinforcing plies 5, 6, 7, 8, 15 and 16 was 90%.

A 0.05 cm thick cotton-fabric interlayer 10 was disposed directly on the surface of the supporting tube 1.

The hose thus manufactured had an inside diameter of 3.8 cm and an outside diameter 6.2 cm. The weight of a linear meter of the hose was 2.2 kg.

The hose was tested in accordance with the procedure outlined in Example 1.

The test results were the following:

| | |
|---|---|
| maximum internal pressure, kgf/cm² | 720 |
| maximum axial tension, metric ton-force | 40.0 |
| maximum radial deformation, percent of the initial dimensions of the unloaded hose | 0.8 |
| maximum axial deformation, percent of the initial dimensions of the unloaded hose | 0.8 |
| maximum volume deformation, percent of the initial dimensions of the unloaded hose | 1.6 |
| minimum bending radius of hose, meters | 0.8 |

EXAMPLE 14

A hose was manufactured, comprising an inner supporting tube 1 (FIG. 4) and an outer protective cover 2, both made of a rubber having a modulus of elasticity of $E=380$ kgf/cm². Four pairs 3, 4, 11, and 14 of reinforcing plies 5 and 6, 7 and 8, 12 and 13, 15 and 16 were interposed between the supporting tube 1 and the protective cover 2. The reinforcing plies 5 and 6, 7 and 8, 12 and 13, 15 and 16 were wrapped from sets of fiberglass threads 9. The angle $\alpha_o$ of wrapping of the threads 9 of the pair 3 of the reinforcing plies 5 and 6 was equal to the angle $\alpha_1$ of wrapping of the threads 9 in the pair 11 of the reinforcing plies 12 and 13 and amounted to 73°, and the angle $\beta_o$ of wrapping of the threads 9 in the pair 4 of the reinforcing plies 7 and 8 was equal to the angle $\beta_1$ of wrapping of the threads 9 in the pair 14 of the reinforcing plies 15 and 16 and amounted to 18°. The diameter of the threads 9 in the pairs 3, 4, 11, and 14 of the reinforcing plies 5 and 6, 7 and 8, 12 and 13, 15 and 16 was $d_{1,2}=0.0975$ cm.

The threads 9 in the pairs 3, 4, 11, and 14 of the reinforcing plies 5 and 6, 7 and 8, 12 and 13, 15 and 16 had a modulus of elasticity of $E_{1,2}=0.4750\cdot10^6$ kgf/cm² and a permissible stress of $[\sigma_{1,2}]=8,016.3$ kgf/cm².

The density of wrapping of the threads 9 in the pairs 3, 4, 11, and 14 of the reinforcing plies 5, 6, 7, 8, 12, 13, 15, and 16 was 90%.

A 0.05 cm thick cotton-fabric interlayer 10 was disposed directly on the surface of the supporting tube 1.

The hose thus manufactured had an inside diameter of 2.5 cm and an outside diameter of 5.4 cm. The weight of a linear meter of the hose was 1.7 kg.

The hose was tested in accordance with the procedure outlined in Example 1.

The test results were the following:

| | |
|---|---|
| maximum internal pressure, kgf/cm² | 1,240 |
| maximum axial tension, metric ton-force | 28.0 |
| maximum radial deformation, percent of the initial dimensions of the unloaded hose | 1.2 |
| maximum axial deformation, percent of the initial dimensions of the unloaded hose | 1.8 |
| maximum volume deformation, percent of the initial dimensions of the unloaded hose | 3.0 |
| minimum bending radius of hose, meters | 0.43 |

EXAMPLE 15

A hose was manufactured comprising an inner supporting tube 1 (FIG. 4) and an outer protective cover 2, both made of a rubber having a modulus of elasticity of $E=380$ kgf/cm². Four pairs 3, 4, 11, and 14 of reinforcing plies 5 and 6, 7 and 8, 12 and 13, 15 and 16 were interposed between the supporting tube 1 and the protective cover 2. The reinforcing plies 5 and 6, 7 and 8, 12 and 13, 15 and 16 were wrapped from sets of polyamide-fibre threads 9. The angle $\alpha_o$ of wripping of the threads 9 in the pair 3 of the reinforcing plies 5 and 6 was equal to the angle $\alpha_1$ of wrapping of the threads 9 in the pair 11 of the reinforcing plies 12 and 13 and amounted to 86°, and the angle $\beta_o$ of wrapping of the threads 9 in the pair 14 of the reinforcing plies 15 and 16 was 10°. The diameter of the threads 9 in the pairs 3, 4, 11, and 14 of the reinforcing plies 5 and 6, 7 and 8, 12 and 13, 15 and 16 was $d_{1,2}=0.16$ cm.

The threads 9 in the pairs 3, 4, 11, and 14 of the reinforcing plies 5 and 6, 7 and 8, 12 and 13, 15 and 16 had a modulus of elasticity of $E_{1,2}=0.0040 \cdot 10^6$ kgf/cm$^2$ and a permissible stress of $[\sigma_{1,2}]=2,000.0$ kgf/cm$^2$.

The density of wrapping of the threads 9 in the pairs 3,4, 11, and 14 of the reinforcing plies 5 and 6, 7 and 8, 12 and 13, 15 and 16 was of 90%.

A 0.05 cm thick cotton-fabric interlayer 10 was disposed directly on the surface of the supporting tube 1.

The hose thus manufactured had an inside diameter of 3.8 cm and an outside diameter of 6.8 cm. The weight of a linear meter of the hose was of 1.9 kg.

The hose was tested in accordance with the procedure outlined in Example 1.

The test results were the following:

| | |
|---|---|
| maximum internal pressure, kgf/cm$^2$ | 430 |
| maximum axial tension, metric ton-force | 15.5 |
| maximum radial deformation, percent of the initial dimensions of the unloaded hose | 2.1 |
| maximum axial deformation, percent of the initial dimensions of the unloaded hose | 2.7 |
| maximum volume deformation, percent of the initial dimensions of the unloaded hose | 5.0 |
| minimum bending radius of hose, meters | 0.65 |

EXAMPLE 16

A hose was manufactured comprising an inner supporting tube 1 (FIG. 4) and an outer protective cover 2, both made of a rubber having a modulus of elasticity of $E_o=380$ kgf/cm$^2$. Three pairs 3, 4, and 11 of reinforcing plies 5 and 6, 7 and 8, 12 and 13 were interposed between the supporting tube 1 and the protective cover 2. The reinforcing plies 5 and 6, 12 and 13 were wrapped from sets of polyamide-fibre threads 9, and the reinforcing plies 7 and 8 were wrapped from sets of fiberglass threads 9. The angle $\alpha_o$ of wrapping of the threads 9 in the pair 3 of the reinforcing plies 5 and 6 was 82°, the angle $\alpha_1$ of wrapping of the threads 9 in the pair 11 of the reinforcing plies 12 and 13 was 84°, and the angle $\beta_o$ of wrapping of the threads 9 in the pair 4 of the reinforcing plies 7 and 8 was 16°. The diameter of the threads 9 in the pairs 3 and 11 of the reinforcing plies 5 and 6, 12 and 13 was $d_1=0.16$ cm, and the diameter of the threads 9 in the pair 4 of the reinforcing plies 7 and 8 was $d_2=0.0975$ cm.

The threads 9 in the pairs 3 and 11 of the reinforcing plies 5 and 6, 12 and 13 had a modulus of elasticity of $E_1=0.0038 \cdot 10^6$ kgf/cm$^2$ and a permissible stress of $[\sigma_1]=2,000.0$ kgf/cm$^2$. The threads 9 in the pair 4 of the reinforcing plies 7 and 8 had a modulus of elasticity of $E_2=0.4750 \cdot 10^6$ kgf/cm$^2$ and a permissible stress of $[\sigma_2]=8,016.3$ kgf/cm$^2$.

The density of wrapping of the threads 9 in the pairs 3, 4, and 11 of the reinforcing plies 5, 6, 7, 8, 12, and 13 was 90%.

A 0.05 cm thick cotton-fabric interlayer 10 was disposed directly on the surface of the supporting tube 1.

The hose thus manufactured had an inside diameter of 1.6 cm and an outside diameter of 4.4 cm. The weight of a linear meter of the hose was 1.5 kg.

The hose was tested in accordance with the procedure outlined in Example 1.

The test results were the following:

| | |
|---|---|
| maximum internal pressure, kgf/cm$^2$ | 820 |
| maximum axial tension, metric ton-force | 7.0 |
| maximum radial deformation, percent of the initial dimensions of the unloaded hose | 1.2 |
| maximum axial deformation, percent of the initial dimensions of the unloaded hose | 0.8 |
| maximum volume deformation, percent of the initial dimensions of the unloaded hose | 2.0 |
| minimum bending radius of hose, meters | 0.35 |

EXAMPLE 17

A hose was manufactured comprosing an inner supporting tube 1 (FIG. 4) and an outer protective cover 2, both made of a rubber having a modulus of elasticity of $E_o=80$ kgf/cm$^2$. Three pairs 3, 4, and 11 of reinforcing plies 5 and 6, 7 and 8, 12 and 13 were interposed between the supporting tube 1 and the protective cover 2. The reinforcing plies 5, 6, 7, 8, 12, and 13 were wrapped from sets of fiberglass threads. The angle $\alpha_o$ of wrapping of the threads 9 in the pair 3 of the reinforcing plies 5 and 6 was 87°, the angle $\alpha_1$ of wrapping of the threads 9 in the pair 11 of the reinforcing plies 12 and 13 was 87°30′, and the angle $\beta_o$ of wrapping the threads 9 in the pair 4 of the reinforcing plies 7 and 8 was 18°. The diameter of the threads 9 in the pairs 3 and 11 of the reinforcing plies 5 and 6, 12 and 13 was $d_1=0.0975$ cm, and the diameter of the threads 9 in the pair 4 of the reinforcing plies 7 and 8 was $d_2=0.0770$ cm.

The threads 9 in the pairs 3 and 11 of the reinforcing plies 5 and 6, 12 and 13 had a modulus of elasticity of $E_1=0.4750 \cdot 10^6$ kgf/cm$^2$ and a permissible stress of $[\sigma_1]=8,016.3$ kgf/cm$^2$. The threads 9 in the pair 4 of the reinforcing plies 7 and 8 had a modulus of elasticity of $E_2=0.5207 \cdot 10^6$ kgf/cm$^2$ and a permissible stress of $[\sigma_1]=8,389.3$ kgf/cm$^2$.

The density of wrapping of the threads 9 in the pairs 3 and 11 of the reinforcing plies 5 and 6, 12 and 13, and in the pair 4 of the reinforcing plies 7 and 8 was 90%.

A 0.05 cm thick cotton-fabric interlayer 10 was disposed directly on the surface of the supporting tube 1.

The hose thus manufactured had an inside diameter of 1.0 cm and an outside diameter of 3.7 cm. The weight of a linear meter of the hose was 0.8 kg.

The hose was tested in accordance with the procedure outlined in Example 1.

The test results were the following:

| | |
|---|---|
| minimum internal pressure, kgf/cm | 2,000 |
| maximum axial tension, metric ton-force | 5.0 |
| maximum radial deformation, percent of the initial dimensions of the unloaded hose | 0.3 |
| maximum axial deformation, percent of the initial dimensions of the unloaded hose | 0.9 |
| maximum volume deformation, percent of the initial dimensions of the unloaded hose | 1.2 |
| minimum bending radius of hose, meters | 0.2 |

EXAMPLE 18

A hose was manufactured, comprising an inner supporting tube 1 (FIG. 2) and an outer protective cover 2, both made of a rubber having a modulus of elasticity of $E_o=240$ kgf/cm$^2$. Three pairs 3, 4, and 11 or reinforcing plies 5 and 6, 7 and 8, 12 and 13 were interposed between the supporting tube 1 and the protective cover 2. The reinforcing plies 5 and 6, 12 and 13 were wrapped from sets of polyamide-fiber threads 9, and the reinforcing plies 7 and 8 were wrapped from sets of fiberglass threads 9. The angle $\alpha_o$ of wrapping of the threads 9 in the pair 3 of the reinforcing plies 5 and 6 was 83°, the angle $\alpha_1$ of wrapping of the threads 9 in the pair 11 of the reinforcing plies 12 and 13 was of 88°, and the angle $\beta_o$ of wrapping of the threads 9 of the pair 4 of the reinforcing plies 7 and 8 was 8°. The diameter of the threads 9 in the pairs 3 and 11 of the reinforcing plies 5 and 6, 12 and 13 was $d_1=0.16$ cm, and the diameter of the threads 9 in the pair 4 of the reinforcing plies 7 and 8 was of $d_2=0.0770$ cm.

The threads 9 in the pairs 3 and 11 of the reinforcing plies 5 and 6, 12 and 13 had a modulus of elasticity of $E_1=0.0038 \cdot 10^6$ kgf/cm$^2$ and a permissible stress of $[\sigma_1]=2,000.0$ kgf/cm$^2$.

The threads 9 in the pair 4 of the reinforcing plies 7 and 8 had a modulus of elasticity of $E_2=0.5207 \cdot 10^6$ kgf/cm$^2$ and a permissible stress of $[\sigma_2]=8,389.3$ kgf/cm$^2$.

The density of wrapping of the threads 9 in the pairs 3, 4, and 11 of the reinforcing plies 5, 6, 7, 8, 12, and 13 was 90%.

A 0.05 cm thick cotton-fabric interlayer 10 was disposed directly on the surface of the supporting tube 1.

The hose thus manufactured had an inside diameter of 1.6 cm and an outside diameter of 4.4 cm. The weight of a linear meter of the hose was of 1.5 kg.

The hose was tested in accordance with the procedure outlined in Example 1.

The test results were the following:

| | |
|---|---|
| maximum internal pressure, kgf/cm$^2$ | 920 |
| maximum axial tension, metric ton-force | 8.0 |
| maximum radial deformation, percent of the initial dimensions of the unloaded hose | 1.0 |
| maximum axial deformation, percent of the initial dimensions of the unloaded hose | 0.3 |
| maximum volume deformation, percent of the initial dimensions of the unloaded hose | 1.3 |
| minimum bending radius of hose, meters | 0.35 |

EXAMPLE 19

A hose was manufactured, comprising an inner supporting tube 1 (FIG. 2) and an outer protective cover 2, both made of a rubber having a modulus of elasticity of $E_o=240$ kgf/cm$^2$. Three pairs 3, 4, and 14 of reinforcing plies 5 and 6, 7 and 8, 15 and 16 were interposed between the supporting tube 1 and the protective cover 2. The reinforcing plies 5 and 6 were wrapped from sets of fiberglass threads 9, and the reinforcing plies 7 and 8, 15 and 16 were wrapped from the sets of polyamide-fiber threads 9. The angle $\alpha_o$ of wrapping of the threads 9 in the pair 3 of the reinforcing plies 5 and 6 was 86°, the angle $\beta_o$ of wrapping of the threads 9 in the pair 4 of the reinforcing plies 7 and 8 was 12°, and the angle $\beta_1$ of wrapping of the threads 9 in the pair 14 of the reinforcing plies 15 and 16 was 7°. The diameter of the threads 9 in the pair 3 of the reinforcing plies 5 and 6 was $d_1=0.0770$ cm, and the diameter of the threads 9 in the pair 4 and 14 of the reinforcing plies 7 and 8, 15 and 16 was $d_2=0.16$ cm.

The threads 9 in the pair 3 of the reinforcing plies 5 and 6 had a modulus of elasticity of $E_1=0.5207 \cdot 10^6$ kgf/cm$^2$ and a permissible stress of $[\sigma_1]=8,389.3$ kgf/cm$^2$.

The threads 9 in the pairs 4 and 14 of the reinforcing plies 7 and 8, 15 and 16 had a modulus of elasticity of $E_2=0.0028 \cdot 10^6$ kgf/cm$^2$ and a permissible stress of $[\sigma_2]=2,000.0$ kgf/cm$^2$.

The density of wrapping of the threads 9 in the pairs 3, 4, and 14 of the reinforcing plies 5, 6, 7, 8, 15 and 16 was 90%.

A 0.05 cm thick cotton-fabric interlayer 10 was disposed directly on the surface of the supporting tube 1.

The hose thus manufactured had an inside diameter of 2.5 cm and an outside diameter of 5.3 cm. The weight of a linear meter of the hose was 1.7 kg.

The hose was tested in accordance with the procedure outlined in Example 1.

The test results were as follows:

| | |
|---|---|
| maximum internal pressure, kgf/cm$^2$ | 660 |
| maximum axial tension, metric ton-force | 9.0 |
| maximum radial deformation, percent of the initial dimensions of the unloaded hose | 0.6 |
| maximum axial deformation, percent of the initial dimensions of the unloaded hose | 3.0 |
| maximum volume deformation, percent of the initial dimensions of the unloaded hose | 3.6 |
| minimum bending radius of hose, meters | 0.55 |

EXAMPLE 20

A hose was manufactured, comprising an inner supporting tube 1 (FIG. 3) and an outer protective cover 2, both made of a rubber having a modulus of elasticity of $E_o=380$ kgf/cm$^2$. Three pairs 3, 4, and 14 of the reinforcing plies 15 and 16 were interposed between the supporting tube 1 and the protective cover 2. The reinforcing plies 5 and 6, 7 and 8, 15 and 16 were wrapped from sets of fiberglass threads 9. The angle $\alpha_o$ of wrapping of the threads 9 in the pair 3 of the reinforcing plies 5 and 6 was 78°, the angle $\beta_o$ of wrapping of the threads 9 in the pair of the reinforcing plies 7 and 8 was 6°. The angle $\beta_1$ of wrapping of the threads 9 in the pair 14 of the reinforcing plies 15 and 16 was 4°. The diameter of the threads 9 in the pair 3 of the reinforcing plies 5 and 6 was $d_1=0.055$ cm, and the diameter of the threads 9 in the pairs 4 and 14 of the reinforcing plies 7 and 8, 15 and 16 was $d_2=0.0975$ cm.

The threads 9 in the pair 3 of the reinforcing plies 5 and 6 had a modulus of elasticity of $E_1=0.5950 \cdot 10^6$ kgf/cm$^2$ and a permissible stress of $[\sigma_1]=8,423.0$ kgf/cm$^2$. The threads 9 in the pairs 4 and 14 of the reinforcing plies 7 and 8, 15 and 16 had a modulus of elasticity of $E_2=0.4750 \cdot 10^6$ kgf/cm$^2$ and a permissible stress of $[\sigma_2=8,016.3$ kgf/cm$^2$.

The density of wrapping of the threads 9 in the pairs 3, 4, and 14 of the reinforcing plies 5, 6, 7, 8, 15, and 16 was of 90%.

A 0.05 cm thick cotton-fabric interlayer 10 was disposed directly on the surface of the supporting tube 1.

The hose thus manufactured had an inside diameter of 3.8 cm and an outside diameter of 6.2 cm. The weight of a linear meter of the hose was 2.2 kg.

The hose was tested in accordance with the procedure outlined in Example 1.

The test results were as follows:

| | |
|---|---|
| maximum internal pressure, kgf/cm$^2$ | 720 |
| maximum axial tension, metric ton-force | 45.0 |

| | |
|---|---|
| maximum radial deformation, percent of the initial dimensions of the unloaded hose | 0.8 |
| maximum axial deformation, percent of the initial dimensions of the unloaded hose | 0.8 |
| maximum volume deformation, percent of the initial dimensions of the unloaded hose | 1.6 |
| minimum bending radius of hose, meters | 0.85 |

EXAMPLE 21

A hose was manufactured, comprising an inner supporting tube 1 (FIG. 4) and an outer protective cover 2, both made of a rubber having a modulus of elasticity of $E_o = 380$ kgf/cm$^2$. Four pairs 3, 4, 11, and 14 of reinforcing plies 5 and 6, 7 and 8, 12 and 13, 15 and 16 were interposed between the supporting tube 1 and the protective cover 2. The reinforcing plies 5 and 6, 7 and 8, 12 and 13, 15 and 16 were wrapped from sets of fiberglass threads 9. The angle $\alpha_o$ of wrapping of the threads 9 in the pair 3 of the reinforcing plies 5 and 6 was 78°, the angle $\alpha_1$ of wrapping of the threads 9 in the pair 11 of the reinforcing plies 12 and 13 was 80°, the angle $\beta_o$ of wrapping of the threads 9 in the pair 4 of the reinforcing plies 7 and 8 was 18°, and the angle $\beta_1$ of wrapping of the threads 9 in the pair 14 of the reinforcing plies 15 and 16 was 15°30'. The value of the shear of the angle of wrapping of the threads $\Delta\alpha_1 = \alpha_1 - \alpha_o = 2°$, and the value of the shift $\Delta\beta_1 = \beta_1 - \beta_o = 2°30'$. Thus, $\Delta\alpha_1 = 0.8 \Delta\beta_1$. The diameter of the threads 9 in the pairs 3, 4, 11 and 14 of the reinforcing plies 5 and 6, 7 and 8, 12 and 13, 15 and 16 was $d_{1,2} = 0.0975$ cm. The threads 9 in the pairs 3, 4, 11, 14 of the reinforcing plies 5 and 6, 7 and 8, 12 and 13, 15 and 16 had a modulus of elasticity of $E_{1,2} = 0.4750 \cdot 10^6$ kgf/cm$^2$ and a permissible stress of $[\sigma_{1,2}] = 8,016.3$ kgf/cm$^2$.

The density of wrapping of the threads 9 in the pairs 3, 4, 11, and 14 of the reinforcing plies 5, 6, 7, 8, 12, 13, 15, and 16 was 90%.

A 0.05 cm thick cotton-fabric interlayer 10 was disposed directly on the surface of the supporting tube 1.

The hose thus manufactured had an inside diameter of 2.5 cm and an outside diameter of 5.4 cm. The weight of a linear meter of the hose was 1.7 kg.

The hose was tested in accordance with the procedure outlined in Example 1.

The test results were as follows:

| | |
|---|---|
| maximum internal pressure, kgf/cm$^2$ | 1,320 |
| maximum axial tension, metric ton-force | 31.0 |
| maximum radial deformation, percent of the initial dimensions of the unloaded hose | 1.2 |
| maximum axial deformation, percent of the initial dimensions of the unloaded hose | 1.8 |
| maximum volume deformation, percent of the initial dimensions of the unloaded hose | 3.0 |
| minimum bending radius of hose, meters | 0.43 |

EXAMPLE 22

A hose was manufactured, comprising an inner supporting tube 1 (FIG. 4) and an outer protective cover 2, both made of a rubber having a modulus of elasticity of $E_o = 380$ kgf/cm$^2$.

Four pairs 3, 4, 11, 14 of reinforcing plies 5 and 6, 7 and 8, 12 and 13, 15 and 16 were interposed between the supporting tube 1 and the protective cover 2. The reinforcing plies 5 and 6, 7 and 8, 12 and 13, 15 and 16 were wrapped from sets of polyamide-fiber threads 9. The angle $\alpha_o$ of wrapping of the threads 9 in the pair 3 of the reinforcing plies 5 and 6 was 86°, the angle $\alpha_1$ of wrapping of the threads 9 of the reinforcing plies 12 and 13 was 86°12', the angle $\beta_o$ of wrapping of the threads 9 in the pair 4 of the reinforcing plies 7 and 8 and was 10°, and the angle $\beta_1$ of wrapping of the threads 9 in the pair 14 of the reinforcing plies 15 and 16 was 9°. The value of the shear of the angle of wrapping of the threads was of $\Delta\alpha_1 = \alpha_1 - \alpha_o = 0°12'$, and the value of $\Delta\beta_1$ was $\Delta\beta_1 = \beta_o - \beta_1 = 1°$. Thus, $\Delta\alpha_1 = 0.2 \Delta\beta_1$.

The diameter of the threads 9 in the pairs 3, 4, 11 and 14 of the reinforcing plies 5 and 6, 7 and 8, 12 and 13, 15 and 16 was $d_{1,2} = 0.16$ cm.

The threads 9 in the pairs 3, 4, 11, and 14 of the reinforcing plies 5 and 6, 7 and 8, 12 and 13, 15 and 16 had a modulus of elasticity of $E_{1,2} = 0.0040 \cdot 10^6$ kgf/cm$^2$ and a permissible stress of $[\sigma_{1,2}] = 2,000.0$ kgf/cm$^2$.

The density of wrapping of the threads 9 in the pairs 3, 4, 11, and 14 of the reinforcing plies 5, 6, 7, 8, 12, 13, 15, and 16 was 90%.

A 0.05 cm thick cotton-fabric interlayer 10 was disposed directly on the surface of the supporting tube 1.

The hose thus manufactured had an inside diameter of 3.8 cm and an outside diameter of 6.8 cm. The weight of a linear meter of the hose was 1.9 kg.

The hose was tested in accordance with the procedure outlined in Example 1.

The test results were as follows:

| | |
|---|---|
| maximum internal pressure, kgf/cm$^2$ | 440 |
| maximum axial tension, metric ton-force | 17 |
| maximum radial deformation, percent of the initial dimensions of the unloaded hose | 2.1 |
| maximum axial deformation, percent of the initial dimensions of the unloaded hose | 2.7 |
| maximum volume deformation, percent of the initial dimensions of the unloaded hose | 5.0 |
| minimum bending radius of hose, meters | 0.65 |

EXAMPLE 23

A hose was manufactured, comprising an inner supporting tube 1 (FIG. 4) and an outer protective cover 2, both made of a rubber having a modulus of elasticity of $E_o = 380$ kgf/cm$^2$. Four pairs 3, 4, 11, and 14 of the reinforcing plies 5 and 6, 7 and 8, 12 and 13, 15 and 16 were interposed between the supporting tube 1 and the protective cover 2. The reinforcing plies 5 and 6, 7 and 8, 12 and 13, 15 and 16 were wrapped from sets of fiberglass threads 9. The angle $\alpha_o$ of wrapping of the threads 9 in the pair 3 of the reinforcing plies 5 and 6 was 78°, the angle $\alpha_1$ of wrapping of the threads 9 in the pair 11 of the reinforcing plies 12 and 13 was 79°, the angle $\beta_o$ of wrapping of the threads 9 in the pair 4 of the reinforcing plies 7 and 8 was 18°, and the angle $\beta_1$ of wrapping of the threads 9 in the pair 14 of the reinforcing plies 15 and 16 was of 16°. The value of the shear of the angle of wrapping of the threads $\Delta\alpha_1 = \alpha_1 - \alpha_o = 1°$ and the value of $\Delta\beta_1 = \beta_o - \beta_1 = 2°$. Thus, $\Delta\alpha_1 = 0.5 \Delta\beta_1$.

The diameter of the threads 9 in the pairs 3, 4, 11 and 14 of the reinforcing plies 5 and 6, 7 and 8, 12 and 13, 15 and 16 was of $d_{1,2} = 0.0975$ cm.

The threads 9 in the pairs 3, 4, 11 and 14 of the reinforcing plies 5 and 6, 7 and 8, 12 and 13, 15 and 16 had a modulus of elasticity of $E_{1,2} = 0.4750 \cdot 10^6$ kgf/cm$^2$ and a permissible stress of $[\sigma_{1,2}] = 8,016.3$ kgf/cm$^2$.

The density of wrapping of the threads 9 in the pairs 3, 4, 11 and 14 of the reinforcing plies 5, 6, 7, 8, 12, 13, 15, and 16 was 90%.

A 0.05 cm thick cotton-fabric interlayer 10 was disposed directly on the surface of the supporting tube 1.

The hose thus manufactured has an inside diameter of 2.5 cm and an outside diameter of 5.4 cm. The weight of a linear meter of the hose was 1.7 kg.

The hose was tested in accordance with the procedure outlined in Example 1.

The test results were as follows:

| | |
|---|---|
| maximum internal pressure, kgf/cm$^2$ | 1,350 |
| maximum axial tension, metric ton-force | 32.0 |
| maximum radial deformation, percent of the initial dimensions of the unloaded hose | 1.2 |
| maximum axial deformation, percent of the initial dimensions of the unloaded hose | 1.8 |
| maximum volume deformation, percent of the initial dimensions of the unloaded hose | 3.0 |
| minimum bending radius of hose, meters | 0.43 |

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

INDUSTRIAL APPLICABILITY

The proposed hose may be used under the conditions of high internal pressures and high axial loads in aggressive and abrasive media for any purposes. It may be used in testing, operation, and washing of oil wells; in laying ground and underwater oil- and gas pipelines; in laying ground and underwater product pipelines, in coal mines; in the systems of oil pipelines if oil is extracted from wells; in systems intended for charging tankers from standpipes located far from berthes; in remote control antiblow-out systems used when drilling oil, gas, and prospecting wells, etc.

We claim:

1. A flexible hose for the conveyance of fluids comprising:
   a. an inner supporting tube of an elastic material;
   b. an interlayer of a non-metallic fabric placed directly on the surface of said inner supporting tube;
   c. a first pair and a second pair of reinforcing plies placed directly one over the other, each of said plies comprising a set of helically wound threads and each of said pairs being formed by two symmetrically wound sets of threads, the winding angles of said sets of threads lying within the range of from 75° to 90° and from 0° to 20°;
   the first pair of reinforcing plies being placed directly on said interlayer and having said threads wound at an angle between 75° and 90° relative to the longitudinal axis of the hose;
   the second pair of reinforcing plies having said threads wound at an angle between 0° and 20° relative to the longitudinal axis of the hose; the reinforcing plies in each pair are oppositely wound with the same helix angle and are disposed directly one over the other;
   additional pairs of reinforcing plies having said threads wound at angles varying within the above-mentioned ranges; and
   d. an outer protective cover made of an elastic material and placed on the surface of the outermost reinforcing ply.

2. A hose as claimed in claim 1, wherein the winding angle of the threads in each additional pair of reinforcing plies, lying within 75° to 90°, increases, while the winding angle of the threads in each additional pair of reinforcing plies, lying within 0° to 20°, decreases relative to the winding angle of the threads in the inner preceding pair of reinforcing plies, lying within the same range, the winding angle of the threads in each additional pair of reinforcing plies changing within the range of 0° 12' to 5°.

3. A hose as claimed in claim 2, wherein the winding angle of the threads in each additional pair of reinforcing plies, lying within 75° to 90°, changes by 0.2 to 0.8 of the value of change in the winding angle of the threads in each additional pair of reinforcing plies lying within the range of 0° to 20°.

* * * * *